(12) United States Patent
Argov et al.

(10) Patent No.: US 8,897,207 B2
(45) Date of Patent: Nov. 25, 2014

(54) METHOD FOR FADE MITIGATION IN A SATELLITE COMMUNICATION NETWORK

(75) Inventors: Nitay Argov, Tel Mond (IL); Shay Mori, Kfar-Saba (IL); Tomer Chavusha, Tel-Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 848 days.

(21) Appl. No.: 12/725,528

(22) Filed: Mar. 17, 2010

(65) Prior Publication Data

US 2010/0238856 A1    Sep. 23, 2010

Related U.S. Application Data

(60) Provisional application No. 61/160,932, filed on Mar. 17, 2009.

(51) Int. Cl.
*H04B 7/185* (2006.01)
*H04W 4/00* (2009.01)

(52) U.S. Cl.
CPC ................................. *H04B 7/1858* (2013.01)

USPC .......................................... 370/317; 370/330

(58) Field of Classification Search
USPC .................... 370/317–318, 329–330
See application file for complete search history.

(56) References Cited

U.S. PATENT DOCUMENTS

| | | | |
|---|---|---|---|
| 7,885,239 B1 * | 2/2011 | Oroskar et al. | 370/336 |
| 8,098,645 B2 * | 1/2012 | Yee et al. | 370/345 |
| 2008/0069045 A1 * | 3/2008 | Delamotte et al. | 370/330 |

OTHER PUBLICATIONS

Extended European Search Report corresponding EP Application No. 10250486.7, dated Jul. 3, 2014.

* cited by examiner

*Primary Examiner* — Afshawn Towfighi
(74) *Attorney, Agent, or Firm* — Banner & Witcoff, Ltd.

(57) ABSTRACT

In a satellite communication network, comprised of a central hub and a plurality of remote terminals, a multi-layered return channel (inbound) bandwidth design, for at least the purpose of mitigating rain fade effects. In addition, an allocation algorithm for allocating timeslots against capacity requests from remote terminals over a multi-layered return channel bandwidth design on a burst-by-burst basis.

17 Claims, 5 Drawing Sheets

METHOD FOR FADE MITIGATION IN A SATELLITE COMMUNICATION NETWORK

RELATED APPLICATIONS

The present application is a non-provisional of U.S. Provisional Application Ser. No. 61/160,932, entitled "A Method For Fade Mitigation In A Satellite Communication Network," filed Mar. 17, 2009, the contents of which are incorporated herein by reference in their entirety for all purposes.

TECHNICAL FIELD

This invention pertains to the field of satellite communication systems. It also pertains to the field of satellite access schemes.

BACKGROUND

In satellite communication systems, information is being transmitted from one earth station to another via a satellite. In order to transmit and receive information, each earth station may be equipped with at least a dish antenna and a satellite transmitter (referred to herein as block up converter, or BUC). The ability of one earth station to receive transmissions of another earth station via a satellite may depend on several factors, including the gain of the transmitting and receiving antennas, the output power of the transmitting BUC, one or more parameters of the satellite being used (e.g. gain) and the positions of the earth stations relative to the radiation footprint of the satellite.

Another important factor which may affect reception capability is related to atmospheric conditions, particularly the existence of water in the signal's path at the time of transmission. The more water in the signal's path (e.g. in the form of clouds, vapors, rain, hale or snow), the higher the attenuation inflicted by the atmosphere upon the transmitted signal. Since a signal transmitted over satellite fades as rain intensity increases, this entire phenomenon is often referred to as rain fade (i.e. regardless if the attenuation is caused by rain or another form of showers e.g. snow). The effects of rain fade (i.e. the magnitude of the attenuation inflicted on a transmitted signal) depend on the frequency band being used (e.g. C-band, Ku-band, Ka-band or another), where the higher the frequency the deeper the fade being experienced for a given level of rain intensity.

Rain fades may affect the availability of a satellite communication network. If various gains are insufficient and/or if transmission power level is not high enough to begin with, connectivity between earth stations may be interrupted during rain fades.

One method for coping with rain fades and insuring high availability is using high gain antennas and high power BUC units. However, since the gain of a dish antenna is proportional to its size (i.e. its diameter), a high gain antenna also means a large antenna, which may require special installation considerations, motorized pointing and tracking systems, etc. Thus large antennas, as well as high power BUC units, are quite expensive. Therefore, this method is very expensive and in some cases may be economically infeasible.

On the other hand, the total duration of extreme rain fades is usually measured in several hours per year. Therefore, users of satellite communication systems are often willing to accept loss of connectivity during such times in order to use less expensive equipment and to make such networks economically feasible. For example, some satellite communication users may accept an availability level of 99.8%, which corresponds to total unavailability of approximately 17.5 hours per year. Some users may require higher availability and some will settle for lower availability (e.g. 99.5% which corresponds to slightly less than 2 days of outage per year).

The introduction of adaptive coding and modulation techniques (e.g. in the $2^{nd}$ generation Digital Video Broadcasting via Satellite standard (DVB-S2)) may enable satellite communication systems to be designed in a more cost-effective manner. A network may be designed to perform at high efficiency at clear-sky (i.e. best) conditions and to switch to less efficient but more robust modulation and coding whenever degradation in link conditions is experienced. During degradation periods, the total throughput over a satellite link may be reduced but communication may still be available.

In a satellite communication network, comprised of a central hub and a plurality of remote terminals, information in the inbound direction (i.e. from the remote terminals to the central hub) is often transmitted over shared bandwidth for at least the purpose of increasing bandwidth utilization efficiency. There are many methods known in the art, also known as access schemes, for administrating use of the common inbound bandwidth. Of these methods, those based on reservation techniques (i.e. where a remote terminal is allowed to transmit only on bandwidth assigned to it, e.g. by a central hub) have the highest bandwidth utilization efficiency.

However, all known reservation techniques are based on a predefined time-frequency plan (TFP). Both the hub and the remote terminals are aware of a division of the inbound bandwidth to channels and possibly of each channel to timeslots. Channel speed (i.e. symbol rate) as well as modulation and coding of each timeslot may be predefined. Therefore, use of adaptive modulation and coding techniques in the inbound direction of said satellite communication networks is quite limited.

Furthermore, in order to achieve bandwidth utilization efficiency during at least 99% of the time, most of the inbound channels should be designed for clear-sky conditions, during which the expected reception signal to noise ratio (SNR) is sufficient to support higher spectral density (i.e. more data bits per each bandwidth unit). However, such design is vulnerable to rain fade events, which may affect the link between a central hub and the satellite, especially if the antenna at the hub is relatively small and/or the satellite being used has relatively low gain. During such events, most of the inbound bandwidth becomes unusable as the reception SNR drops below the level necessary for receiving a signal transmitted using the predefined channel speed, modulation and coding. Consequently, most if not all the remote terminals in such networks experience lack of service, which may last as long as fade conditions persist, sometimes for many minutes.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Considering a satellite communication network comprised of a central hub and a plurality of remote terminals.

In one aspect of this invention, the hub of a satellite communication network may be configured to employ a multi-layered return channel (inbound) bandwidth design and to determine which of several overlapping time-frequency plans to use on a burst-by-burst basis, for at least the purpose of mitigating rain fade effects.

In another aspect of this invention, all timeslots over all channels in all layers of a multi-layered time-frequency plan may be configured to have the same structure, to include the same number of user bits and to be transmitted using a single combination of modulation and forward error correction coding, for at least the purpose of having the same length in transmission symbols for all said timeslots.

In yet another aspect of this invention, in each of the different layers of a multi-layered time-frequency plan all channels may be of a single symbol rate (speed) and the symbol rates of any two layers may relate to one another by a factor of N, where N is a natural number. Combined with the uniform length of timeslots in terms of transmission symbols, a prefect alignment between timeslots over the different layers may be achieved, at least for the purpose of minimizing bandwidth waste and allocation blockage.

In a further aspect of this invention, a hub of a satellite communication network may be configured to employ a multi-layered return channel (inbound) bandwidth design and an allocation algorithm, which may be configured to allocate timeslots against capacity requests from remote terminals over said bandwidth design on a burst-by-burst basis.

In yet a further aspect of the invention, the hub of a satellite communication network may be configured to employ a multi-layered return channel (inbound) bandwidth design with variable timeslot lengths, for at least the purpose of providing graceful degradation in upload speed during relatively small fade events.

BRIEF DESCRIPTION OF THE DRAWINGS

Figure 1:
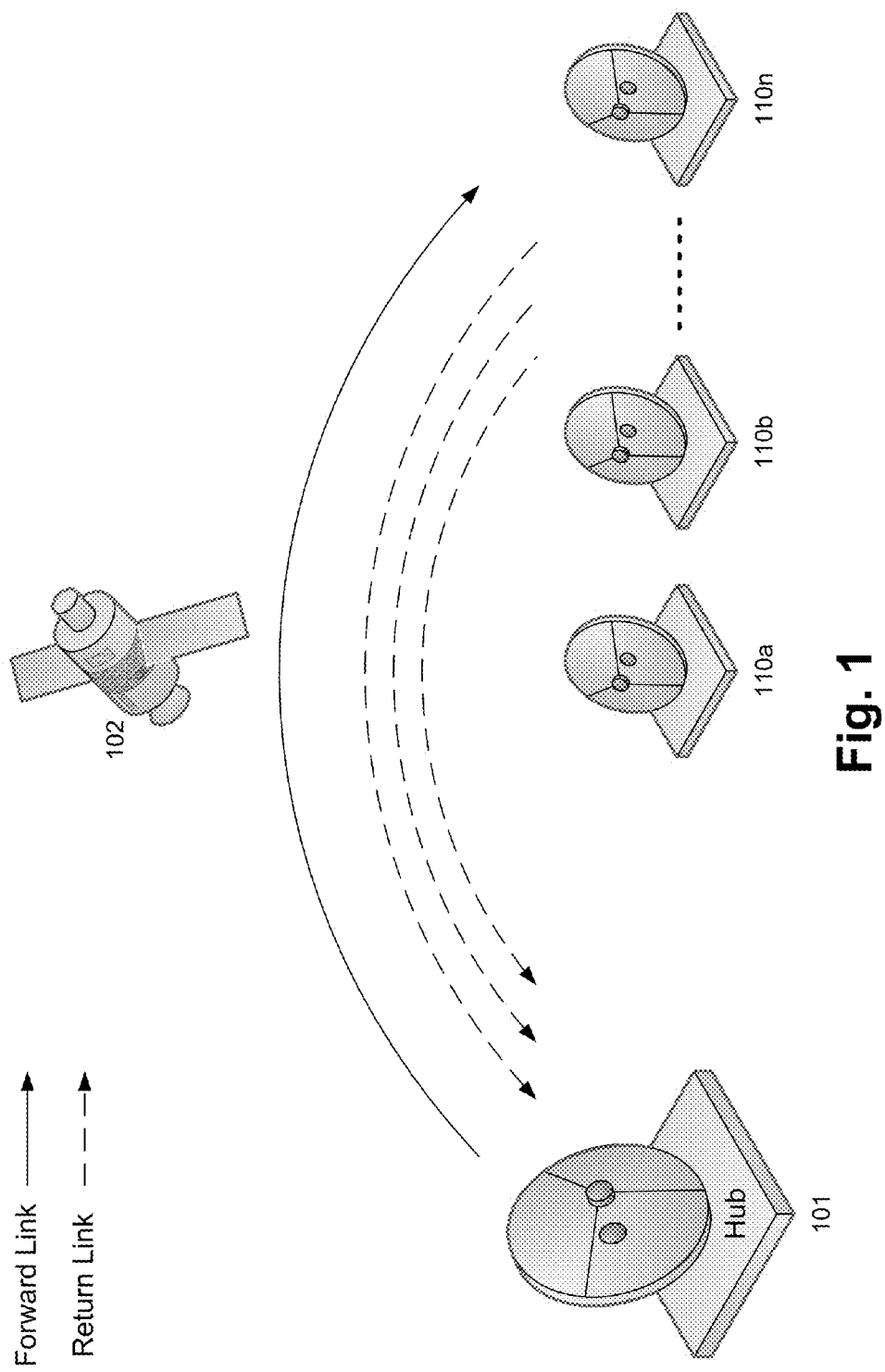

Having thus described the invention in general terms, reference will now be made to the accompanying drawings, which are not necessarily drawn to scale, and wherein:

FIG. 1 shows a schematic description of a satellite communication network in accordance with aspects of this invention.

Figure 2:
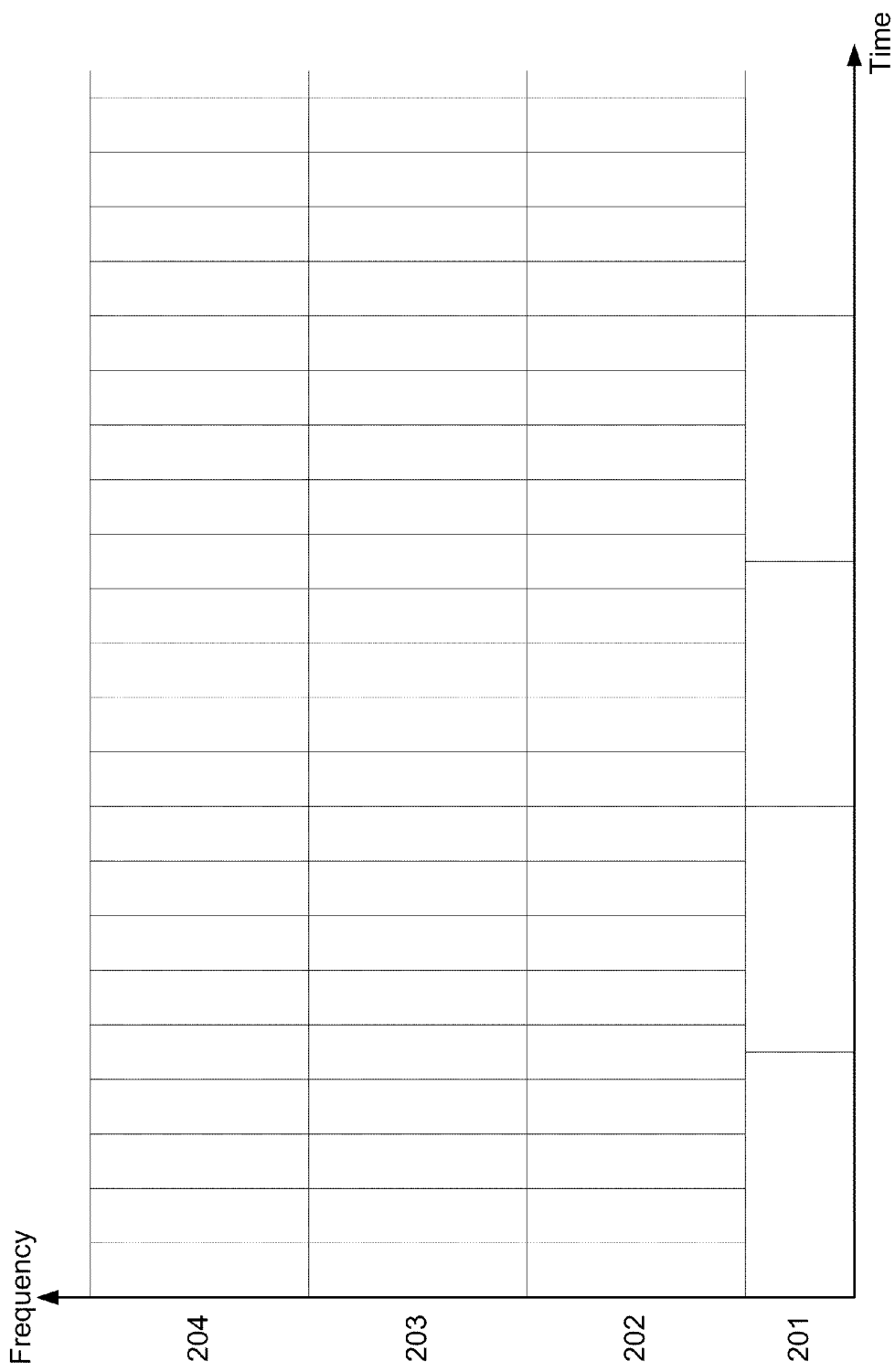

FIG. 2 shows a traditional return channel bandwidth design, based on the DVB-RCS method.

Figure 3:
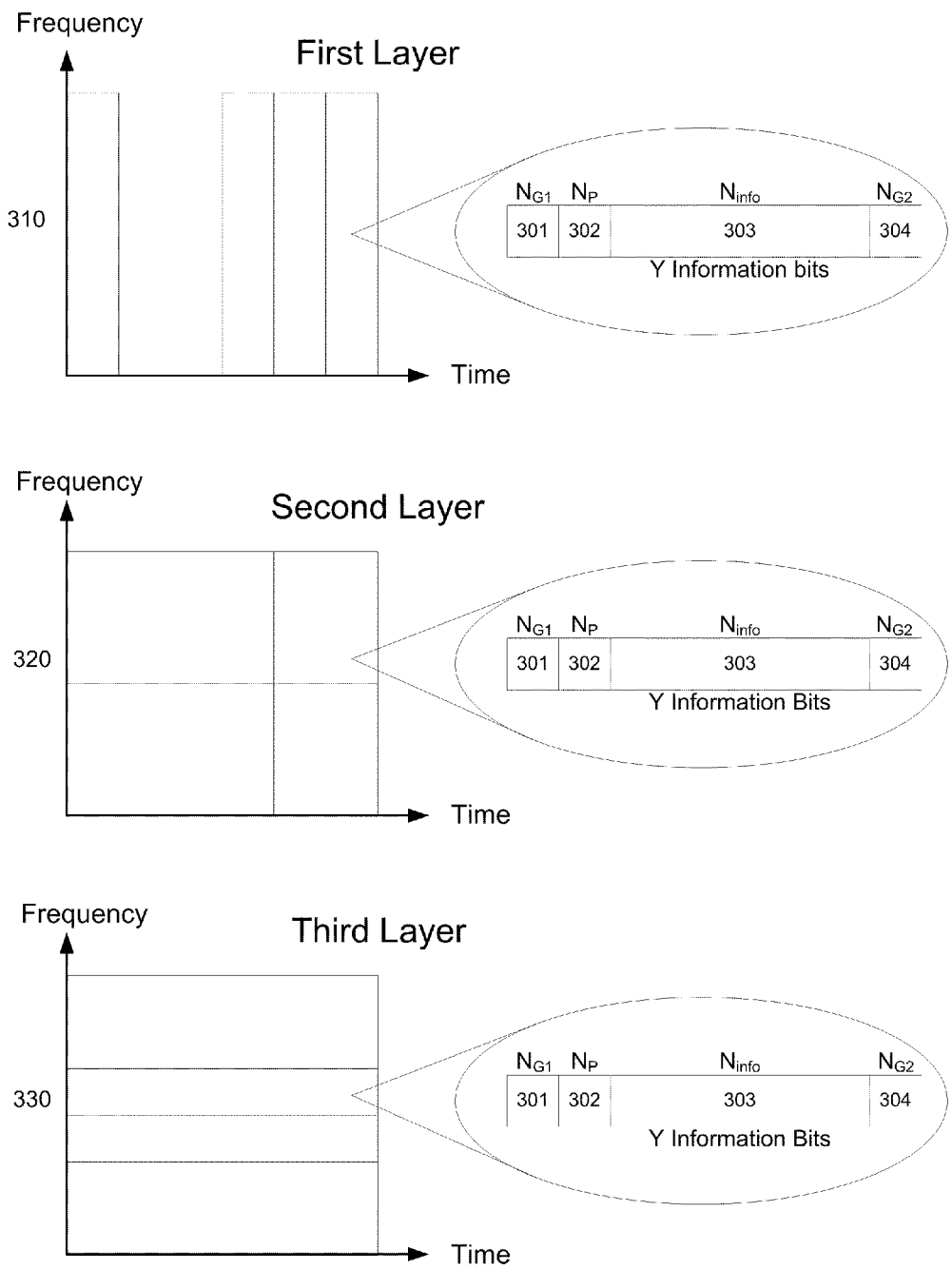

FIG. 3 shows a multi-layered return channel bandwidth design with a uniform timeslot in accordance with aspects of this invention.

Figure 4:
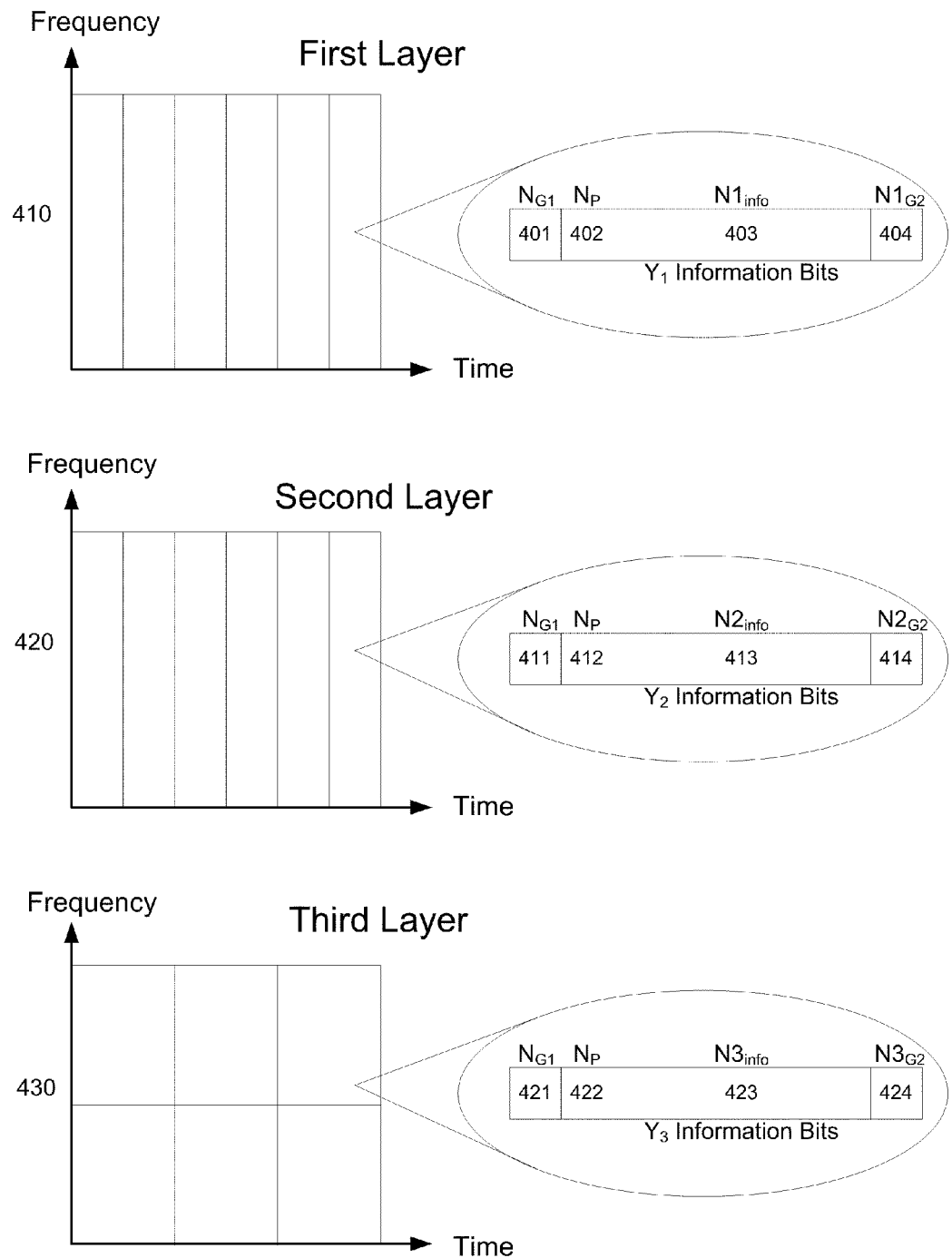

FIG. 4 shows a multi-layered return channel bandwidth design with variable timeslot in accordance with aspects of this invention.

Figure 5:
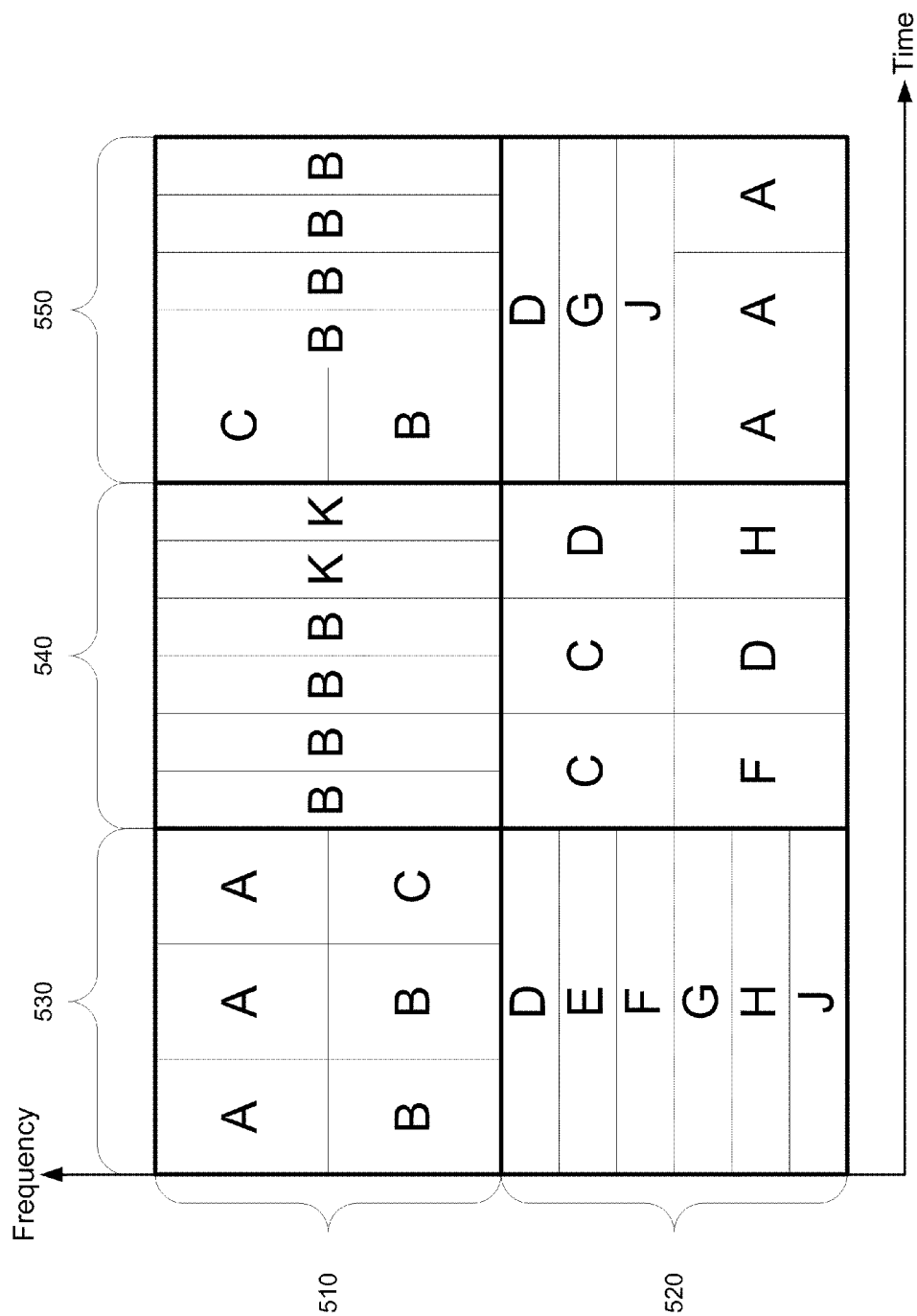

FIG. 5 shows an example allocation over a multi-layered return channel in accordance with aspects of this invention.

DETAILED DESCRIPTION

The following description makes references to Digital Video Broadcasting—Return Channel via Satellite (DVB-RCS) (EN 301 790), which is an access scheme based on the reservation approach. It shall be appreciated by anyone skilled in the art that the purpose of such references is simplifying the description of the invention and that by no means such references limit the scope of the invention in any way to DVB-RCS or to any type of access scheme.

Considering a satellite communication network comprised of a central hub and plurality of remote terminals, as shown in FIG. 1. Each remote terminal 110 may be comprised of at least a dish antenna and a satellite transmitter (BUC). In addition, a remote terminal may further include any one or more of a low-noise block (LNB) for at least amplifying and down-converting received signals, a processing unit with applicable peripheral hardware, interfaces to user equipment (e.g. local area network (LAN) interfaces) and software, for at least the purpose of controlling the remote terminal and processing user traffic. The hub 101 may be comprised of a dish antenna (often larger than that of a remote terminal), satellite transmitter and receiver, based-band equipment (e.g. a modulator, return channel receivers, etc) and one or more processors, for at least the purpose of controlling the network and processing user traffic.

Furthermore, the satellite communication network shown in FIG. 1 may be configured to at least support bidirectional exchange of user traffic and control information between any of the remote terminals and the hub. In some embodiments, said satellite communication network may be further configured to support direct exchange of user traffic and control information between remote terminals, i.e. in mesh topology.

In said satellite communication network, hub 101 and remote terminals 110 may be configured to use satellite bandwidth in accordance with a predetermined access scheme. In some embodiments of this invention, the DVB-RCS method may be the access scheme of choice, though other access schemes are possible.

FIG. 2 shows a traditional return channel (inbound) bandwidth design, based on the DVB-RCS method. In order for the satellite communication network to efficiently use the return channel bandwidth and to offer high upload speed to users of the remote terminals, most of the bandwidth is populated with channels (202, 203 and 204) and timeslot types, which require relatively high signal to noise ratio (SNR), where such SNR may be achieved in clear-sky conditions. In addition, a small portion of the return channel bandwidth may be populated with one or more channels (201) and timeslot types, which require a significantly lower SNR, for at least the purpose of allowing remote terminals experiencing less than clear-sky conditions to maintain connectivity and offer at least some level of service to their end users.

However, the return channel (inbound) bandwidth design shown in FIG. 2 may be vulnerable to rain fade events occurring over the hub's location. If the antenna at the hub is relatively small and/or the satellite being used has relatively low gain, even small fades (e.g. up to 4 dB) over the hub may result in significant fade (e.g. over 1 dB) of the entire return channel. Even if the hub is configured with a large antenna and the satellite has sufficient gain to support the link most of the time, an intense rain over the hub may result in a deep fade, which may again have significant effect on the entire return channel. In either scenario, many remote terminals, if not all of them, may be received at the hub at SNR levels lower than required for insuring successful reception over the efficient channels (202, 203 and 204) and timeslot types. All these remote terminals may need to utilize the small portion of the return channel bandwidth containing channels and timeslot types with lower SNR requirements (201). The satellite communication network may "cave" into utilizing only a small portion of the designed return channel bandwidth. Since user demand is not affected by link conditions, each remote terminal may be allocated (or otherwise may be configured to use) only a fraction of the bandwidth it actually needs, if any. Within seconds the satellite communication network becomes highly congested and practically unusable, as many user applications (e.g. real-time applications, interactive applications and others) may not be sustained under such capacity starvation conditions, even if such conditions last for only few seconds, to say the least if they last more than that.

FIG. 3 shows a multi-layered return channel (inbound) bandwidth design in accordance with aspects of this invention. Instead of a two dimensional time-frequency plan, the return channel bandwidth design is comprised of multiple layers 310, 320 and 330 of two dimensional time-frequency plans, simultaneously overlapping in frequency and time to create a three dimensional time-frequency plan.

In one aspect of this invention, the hub of a satellite communication network (as shown in FIG. 1) may be configured to employ a multi-layered return channel (inbound) bandwidth design, as shown in FIG. 3. The hub may be further configured to determine which of the overlapping time-frequency plans (310, 320 or 330) to use on a burst-by-burst basis, for at least the purpose of mitigating rain fade effects.

In some embodiments of this invention, the satellite communication network may be configured to employ a reservation-based access scheme, such as but not limited to DVB-RCS. In such embodiments, the hub may be configured to receive capacity requests from remote terminals and then to allocate timeslots on the time-frequency plan to the requesting remote terminals. The hub may be further configured to consider many factors when determining which timeslots to allocate to a remote terminal, including but not limited to the maximal transmission capabilities of the remote terminal (i.e. the maximal SNR at which a remote terminal may be received for a given timeslot type if the remote terminal is to transmit at maximal allowed power) and the total capacity the remote terminal requests.

In another aspect of this invention, all timeslots over all channels in all layers of a multi-layered time-frequency plan, as shown in FIG. 3, may be configured to have the same structure (e.g. in terms of guards 301 and 304, preambles 302, etc), to include the same number of user bits (Y information bits in FIG. 3) and to be transmitted using a single combination of modulation and forward error correction coding (this combination is further referred to herein as MODCOD). Where all parts of a timeslot (e.g. guards 301 and 304, preamble 302, information 303) may be represented in transmission symbols (i.e. with no parts which are of fixed length in time regardless of a channel symbol rate), the result of using a single MODCOD combination is that all timeslots comprising the multi-layered time-frequency plan are of the same length in transmission symbols ($N_{G1}$ and $N_{G2}$ for guard symbols, $N_P$ for preamble symbols and $M_{Info}$ for information symbols). Therefore, if a first timeslots is located on a channel of a first symbol rate and a second channel is located on a channel of a second symbol rate, and the symbol rates of the two channels relate to one another by a factor of N, the durations of the corresponding timeslots relate to one another by a factor of exactly 1/N. For example, if the symbol rate of the second channel is half of that of the first channel, then the duration of a timeslot on the second channel is twice as long as the duration of a timeslot on the first channel.

In yet another aspect of this invention, in each of the different layers of the multi-layered time-frequency plan (310, 320 and 330), all channels may be of a single symbol rate (speed). Furthermore, the symbol rates of any two layers may relate to one another by a factor of N, where N is a natural number. Moreover, if the symbol rate of a first layer is $Rs_1$, the symbol rate of a second layer is $Rs_2$, where $Rs_1$ equals N times $Rs_2$, then the symbol rate of a third layer, $Rs_3$, may be selected so that $Rs_2$ equals M times $Rs_3$, where M is yet another natural number, which may be either equal or not equal to N. Since all timeslots may be configured to be transmitted using the same MODCOD combination, there would be prefect alignment between timeslots over the different layers. This alignment is important at least for the purposes of minimizing bandwidth waste and allocation blockage. Referring again to the above example, for the duration of each timeslot in the third layer there may be exactly M timeslots in the second layer and for the duration of each timeslot in the second layer there may be exactly N timeslots in the first layer, where every M times N timeslots on the first layer a timeslot may simultaneously begin on all layers (referring to FIG. 3, M equals 3 and N equal 2). It shall be appreciated by anyone skilled in the art, that though the above example and FIG. 3 refer to three layers, the description is valid for any number of layers.

Furthermore, while the first layer (310), which may contain channels at a base symbol rate ($Rs_1$), may be configured for clear-sky conditions, any of the other layers (320 and 330) may provide protection against fade, where the protection level, in dB, equals 10 times the decimal logarithm of the ratio between the base symbol rate ($Rs_1$) and the symbol rate of that layer ($Rs_k$) (i.e. $10*LOG(Rs_1/Rs_k)$). Referring again to the above example and to FIG. 3, if N equals 2 and M equals 3, then the second layer (320) provides 3 dB fade protection ($10*LOG(2)$) and the third layer (330) provides approximately 7.8 dB fade protection ($10*LOG(2*3)$). While transmission capabilities of remote terminals drop (e.g. due to rain fade), the hub may be configured to use on a burst-by-burst basis any of the overlapping layers (310, 320 and 330), i.e. with lower symbol rates which require reduced transmission capabilities, and utilize the entire bandwidth even during fade. Though the maximal upload speed of each remote terminal with reduced transmission capabilities may be significantly reduced, the total throughput of the network remains unchanged, as change in symbol rate does not change the number of bits per any bandwidth unit.

In a further aspect of this invention, a hub of a satellite communication network, as shown in FIG. 1, may be configured to employ a multi-layered return channel (inbound) bandwidth design and an allocation algorithm.

The hub may be configured to allocate timeslots against capacity requests from remote terminals over predefined intervals, referred to herein as allocation periods. For each allocation period, the hub may calculate the total available capacity (e.g. in the case of Digital Video Broadcasting—Return Channel via Satellite (DVB-RCS), the number of Asynchronous Transfer Mode (ATM) cells, Moving Picture Experts Group (MPEG) frames or Traffic (TRF) timeslots, which populate the return channel bandwidth over the allocation period). In a multi-layered time-frequency plan as described above, the total available capacity is the same in each layer. Therefore if the allocation period is rounded to a whole number of timeslots over the lowest symbol rate, the hub may be configured to perform the above calculation using any one of the configured layers.

Once the available capacity is known, the hub may be configured to distribute the available capacity against pending capacity requests from remote terminals. In some embodiments, the hub may be configured to consider applicable quality of service properties (e.g. priority, traffic classification, etc) of each remote terminal and/or each pending request, at least for the purpose of calculating said distribution and/or the number of timeslots to allocate against each pending request during a coming allocation period. In addition, the hub may be configured to determine the current transmission capabilities of a relevant remote terminal and to limit the number of timeslots distributed to that remote terminal to the maximal number of timeslots this remote terminal may transmit during said allocation period. Referring again to the above example (and FIG. 3) and considering that there are J timeslots on each channel of the first layer during an allocation period and that the allocation period is rounded to a whole number of timeslots over the lowest symbol rate, if the transmission capabilities of a remote terminal are sufficient for supporting channels of the second and third layers (320 and 330 respectively) but not those of the first layer (310), the hub may limit the number of timeslots allocated to that remote terminal during said allocation period to J divided by N.

Once the available capacity is distributed, the hub may be configured to allocate the timeslots distributed against each request on the time-frequency plan. The hub may be further configured to first determine the total number of timeslots distributed to each remote terminal during the allocation period against all its pending capacity requests. The hub may then be configured to determine the most suitable layer for allocating the timeslots distributed to a remote terminal during the allocation period. The hub may be configured to select the layer containing channels with the lowest number of timeslots (i.e. lowest symbol rate) over the allocation period, which is still higher or equals to the number of timeslots distributed to the remote terminal during the allocation period. Referring again to the above example, if the remote terminal is allocated X timeslots, where X is lower than J/(N*M), the hub may allocate the timeslots distributed to the remote terminal over a channel in the third layer, though the remote terminal has sufficient capabilities to transmit on channels of the second layer.

As allocation of timeslots using one layer results in blocking all the overlapping timeslots in the other layers, it is possible that though the number of distributed timeslots does not exceed the available number of timeslots in the allocation period, at some point the hub may not be able to allocate on the time-frequency plan the timeslots distributed to a particular remote terminal due to blockage. As the results of such scenarios may depend on the order in which capacity requests are processed, the hub may be further configured to use several mechanisms to insure that over a small number of allocation periods each capacity request is fully satisfied. In some embodiments, the hub may be configured to use a round-robin mechanism or another fairness algorithm, so that in each allocation period the allocation process may be started with the requests of another remote terminal. In addition, in case of only a partial allocation for a remote terminal, the hub may be configured to increase the distribution for that remote terminal in the next allocation period to compensate for the partial allocation. Moreover, in case partial allocation is encountered, the timeslots left unallocated may be redistributed between remote terminals not yet allocated, hence reducing the capacity the hub may need to allocate them during the next allocation period. In addition, if timeslots remain unallocated after allocating to all remotes with pending distribution in the coming allocation period, those timeslots may be allocated using a free capacity distribution mechanism (e.g. against pending requests which previously where not distributed timeslots), so that no capacity is wasted.

FIG. 5 shows an example allocation over a multi-layered return channel in accordance with the multi-layered return channel bandwidth design shown in FIG. 3. In this example, the return channel (inbound) bandwidth may be composed of two primary channels (510, 520), where each of them may be further populated at any given period (e.g. periods 530, 540 and 550) in accordance with any of the layers shown in FIG. 3 (310, 320 and 330). It should be appreciated by anyone skilled in the art that the example shown in FIG. 5 is valid with any number of primary channels and any other applicable arrangement of layers, including more or less layers and other symbol rate ratios between the different layers.

Again in reference to FIG. 5, during period 530, primary channel 510 may be allocated in accordance with second layer 320, i.e. the bandwidth may be divided into N channels and M timeslots on each channel (in this example N equals 2 and M equals 3). This may allow remote terminal A to be allocated M timeslots on one channel while the M timeslots on another channel may be allocated to remote terminals B and C. At the same period (530), primary channel 520 may be allocated in accordance with third layer 330, i.e. the bandwidth may be divided into N*M channels with a single timeslot per channel. Consequently, since each remote terminal may normally transmit on a single channel at any given time, each channel may be allocated to a different remote terminal (D to J).

In further reference to FIG. 5, during period 540, primary channel 510 may be allocated in accordance with first layer 310, i.e. the bandwidth may be used as a single channel with M*N timeslots. Remote terminal B may be allocated more timeslots than it may be allocated using any of the other layers due to the higher symbol rate. Remaining timeslots may be allocated to another capable remote terminal, e.g. remote terminal K. At the same period (540), primary channel 520 may be allocated in accordance with second layer 320, as described above (i.e. N channels and M timeslots on each channel). In this instance, it may be noted that remote terminal D may be allocated several timeslots and that the allocation may be distributed over more than one of the N channels.

In yet a further reference to FIG. 5, during period 550, primary channel 510 may be allocated partly in accordance to second layer 320 and partly in accordance to first layer 310. In addition, primary channel 520 may be allocated partially in accordance to second layer 320 and partially in accordance to third layer 330. It should be noted that selection of layers for any primary channel over any period may be independent of any selection of layers for any other primary channel over any period. Thus the fact that both primary channels are shown to have split allocations between layers at the same period has no real meaning.

An allocation as shown in FIG. 5 in reference to period 550 may result, for example, from the following allocation sequence:

a) Allocating a single timeslot to each of remote terminals D, G and J, Since each remote terminal may be allocated a single timeslot, the allocation may be made using third layer 330 on primary channel 520 (i.e. the lowest symbol rate which may sustain the required capacity over the allocation period).

b) Allocating 5 timeslots to remote terminal B. Since such allocation may be possible only over first layer 310 and since first layer 310 may no longer be used on primary channel 520 during period 550, terminal B may be allocated using first layer 310 on primary channel 510.

c) Allocating 3 timeslots to remote terminal A, Since such allocations may require use of at least second layer 320 and since it may be possible to satisfy this requirement by partial allocation of primary channel 520 between second layer 320 and third layer 310, remote terminal A may be allocated using second layer 320 on primary channel 520.

d) Allocating a single timeslot to remote terminal C, where remote terminal C may not have capabilities to sustain any symbol rate above that of second layer 320 at the time of allocation. Though the only vacant timeslot remaining may be on primary channel 510 using first layer 310, it may be possible to allocate primary channel 510 during period 550 partially in accordance to first layer 310 and partially in accordance to second layer 320 while maintaining the already made allocation to remote terminal B. One of the timeslots already allocated to remote terminal B may be reallocated using second layer 320 (instead of first layer 310) hence leaving a timeslot in accordance to second layer 320 available for allocation to remote terminal C, as needed.

FIG. 4 shows a multi-layered return channel bandwidth design with variable timeslot in accordance with further aspects of this invention. In yet further aspects of this invention, the hub of a satellite communication network (as shown if FIG. 1) may be configured to employ a multi-layered return channel (inbound) bandwidth design, as shown in FIG. 4.

In this aspect of the invention, in each of the different layers of the multi-layered time-frequency plan (410, 420 and 430), all channels may be of a single symbol rate (speed) and the symbol rates of any two layers may relate to one another by a factor of N, where N is a natural number, as previously described. In addition, in each of the different layers of the multi-layered time-frequency plan (410, 420 and 430), timeslots may be configured to be transmitted using different MODCOD combinations. However, use of different MODCOD combinations result in timeslots being different in terms of transmission symbols. Considering that some parts of the timeslot are of fixed length in symbols (e.g. guards 401, 411, and 421, and preamble 402, 412 and 422), alignment over the different layers may be restored by determining a different length of the information field for each MODCOD combination used ($Y_1, Y_2$ and $Y_3$ user bits in FIG. 4). In some embodiments, a generic stream encapsulation (GSE) technique may be used for supporting encapsulation of user information into timeslots with different information field length. Therefore, the length of timeslots over all layers may be aligned to approximately the same number of symbols (as information fields 403, 413 and 423 may be of very similar number of symbols $N1_{Info}$, $N2_{Info}$ and $N3_{Info}$ respectively), with any slight misalignments being resolved by increasing the guard at the end of a timeslot (404, 414 and 424) by very few symbols only. Referring to FIG. 4, while $Y_1, Y_2$ and $Y_3$ may be differently configured, the total length of each timeslot, in symbols, is the same:

$$N_{G1}+N_P+N1_{Info}+N1_{G2}=N_{G1}+N_P+N2_{Info}+N2_{G2}=N_{G1}+N_P+N3_{Info}+N3_{G2}$$

In some embodiments, a multi-layered return channel (inbound) bandwidth design, as shown in FIG. 4, may be used for at least the purpose of providing graceful degradation in upload speed during relatively small fade events. In such embodiments, two or more layers may be configured with channels of the same symbol rate but using different MODCOD combinations, hence providing protection of up to several dB with degradation in upload speed considerably lower than 50%. However, in such configuration, total network throughput may be different in each layer.

In yet another aspect of this invention, the access scheme used may not be based on a reservation technique. Each remote terminal may be configured to decide for itself when and on which channel to transmit. In such embodiments, each remote terminal may be configured also to decide which of the overlapping layers to use either on a burst-by-burst basis or on any other suitable basis.

In yet another aspect of this invention, a segment of the return channel (inbound) bandwidth may be covered by a single receiver apparatus, which may be configured to simultaneously receive all possible channels populating that segment of the bandwidth over all the configured layers. The receiver may be further configured to demodulate a signal in accordance with the layer it has been transmitted on while rejecting any false demodulations that may result from the simultaneous coverage of the other layers. Therefore, the parts of the hub responsible for processing received packets from remote terminals are indifferent to the use of a multi-layered return channel (inbound) bandwidth design. In another embodiment of this invention, the same functionality may be achieved using multiple receivers simultaneously covering the same return channel (inbound) bandwidth segment, where each receiver demodulates the channel(s) of only one layer.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. In a satellite communication network comprising a central hub and plurality of remote terminals, a method for return channel bandwidth design, said method comprising:
   creating a multi-layered three dimensional return channel using a plurality of time-frequency layers that simultaneously overlap in frequency and time,
   wherein each time-frequency layer includes a plurality of channels, and all channels in any single time-frequency layer have the same symbol rate,
   wherein each time-frequency layer has a different symbol rate, and wherein the different symbol rates of the different time-frequency layers relate to one another by a factor of N, wherein N is a natural number, and
   wherein each time-frequency layer includes the same number of timeslots.

2. The method of claim 1, wherein the symbol rates of a first layer and a second layer relate by a factor of N, and wherein the symbol rates of the second layer and a third layer relate by a factor of M and where N and M are natural numbers and are not equal to each other.

3. The method of claim 1, wherein all timeslots over all channels in all layers of said multi-layered return channel are configured to have a uniform structure, said uniform structure including at least a leading guard, a preamble, a payload section and a trailing guard, and wherein two timeslot structures are uniform if their corresponding parts are of the same length in terms of transmission symbols.

4. The method of claim 3, wherein said timeslot structure uniformity is achieved through use of a uniform number of user bits in a payload section and transmission using a single combination of modulation and forward error correction coding.

5. The method of claim 1, wherein all timeslots over all channels in all layers of said multi-layered return channel are configured to have a uniform structure, said uniform structure including at least a leading guard, a preamble, a payload section and a trailing guard, and wherein two timeslot structures are uniform if their total length in terms of transmission symbols is the same, while corresponding parts are of different lengths.

6. The method of claim 5, wherein said timeslot length uniformity is achieved through a variable length payload section and different combinations of modulation and forward error correction coding.

7. The method of claim 6, wherein differences in timeslot length are compensated by increasing the trailing guard in accordance with the difference to be compensated.

8. In a satellite communication system comprising a central hub and plurality of remote terminals, a method of fade mitigation comprising:
  employing a multi-layered return channel using at least two time-frequency layers configured to simultaneously overlap in frequency and time to create a multi-layered three dimensional return channel;
  selecting a first time-frequency layer symbol rate ($Rs_1$) to match an expected remote terminal transmission capability under clear-sky conditions, wherein transmission capability is the maximal signal to noise ratio (SNR) at which a remote terminal may be received for a given timeslot type if the remote terminal is to transmit at maximal allowed power; and
  selecting a second time-frequency layer symbol rate ($Rs_2$), wherein $Rs_1$ equals N times $Rs_2$ for at least the purpose of providing fade protection, in dB, of 10 times the decimal logarithm of N ($10*Log(N)$).

9. In a satellite communication system comprising a central hub and plurality of remote terminals, a method for allocating timeslots within a multi-layered return channel, comprising:
  determining a first allocation period, the first allocation period corresponding to a period of time during which timeslots of the multi-layered return channel are to be allocated to the plurality of remote terminals;
  calculating the total available capacity during said first allocation period, based on a number of timeslots in the multi-layered return channel within the first allocation period;
  distributing the total available capacity against pending capacity requests from remote terminals and determining the number of timeslots to allocate against each pending capacity request;
  for each remote terminal, determining the total number of timeslots distributed to said remote terminal in said first allocation period corresponding to all its pending capacity requests;
  selecting a most suitable layer within said multi-layered return channel for satisfying the pending capacity requests of a first remote terminal during the first allocation period; and
  allocating the determined number of timeslots distributed to the first remote terminal during the first allocation period using the selected layer.

10. The method of claim 9, wherein available capacity is calculated in one of Asynchronous Transfer Mode (ATM) cells, Moving Picture Experts Group (MPEG) frames, or time slots.

11. The method of claim 9, wherein the number of timeslots distributed against a pending request is determined in accordance with applicable quality of service criteria and the transmission capability of the requesting remote terminal, at least for the purpose of limiting the total number of timeslots distributed to a remote terminal over all its pending requests to the maximal number of timeslots said remote terminal may transmit during said first allocation period.

12. The method of claim 9, wherein selecting the most suitable layer within said multi-layered return channel for satisfying the pending capacity requests of the first remote terminal during the first allocation period comprises:
  determining which layer within said multi-layered return channel has the lowest number of timeslots per channel that is higher than or equal to the number of timeslots distributed to the first remote terminal.

13. The method of claim 9, further comprising using a round-robin mechanism or another fairness algorithm for at least the purpose of fairly distributing capacity against pending requests and requesting remote terminals.

14. The method of claim 9, further comprising:
  determining that the number of timeslots allocated to a remote terminal is lower than the number of timeslots distributed to said remote terminal; and
  redistributing the remaining unallocated timeslots to at least one other remote terminal.

15. The method of claim 9, further comprising:
  determining, after allocating all distributed timeslots, that the total number of timeslots allocated is lower than the available number of timeslots within said allocation period; and
  allocating the unallocated timeslots using a free capacity distribution mechanism.

16. A central hub device configured to operate in a satellite communication system comprising a plurality of remote terminals, the central hub device comprising one or more processors having memory coupled thereto, the memory comprising computer executable instructions which, when executed by the one or more processors, cause the central hub device to:
  create a multi-layered three dimensional return channel using a plurality of time-frequency layers that simultaneously overlap in frequency and time,
  wherein each time-frequency layer includes a plurality of channels, and all channels in any single time-frequency layer have the same symbol rate,
  wherein each time-frequency layer has a different symbol rate, and wherein the different symbol rates of the different time-frequency layers relate to one another by a factor of N, wherein N is a natural number, and
  wherein each time-frequency layer includes the same number of timeslots.

17. The central hub device of claim 16, the memory comprising further computer executable instructions which, when executed by the one or more processors, cause the central hub device to:
  determine a first allocation period, the first allocation period corresponding to a period of time during which timeslots of the multi-layered three dimensional return channel are to be allocated to the plurality of remote terminals;

calculate the total available capacity during said first allocation period, based on a number of timeslots in the multi-layered return channel within the first allocation period;

distribute the total available capacity against pending requests from remote terminals and determining the number of timeslots to allocate against each pending request;

determine the total number of timeslots distributed to each remote terminal in said first allocation period against all its pending requests;

select a most suitable layer within said multi-layered return channel; and allocate the number of timeslots distributed to the remote terminal during the first allocation period using the selected layer.

* * * * *